Nov. 29, 1949   H. J. NESS ET AL   2,489,459
METALLURGICAL FURNACE
Filed April 15, 1944   12 Sheets-Sheet 5

INVENTORS
H. J. NESS
C. E. THOMAS
BY
M. Reynolds
ATTORNEY

Nov. 29, 1949  H. J. NESS ET AL  2,489,459
METALLURGICAL FURNACE

Filed April 15, 1944  12 Sheets-Sheet 7

INVENTORS
H. J. NESS
C. E. THOMAS
BY
M. G. Reynolds
ATTORNEY

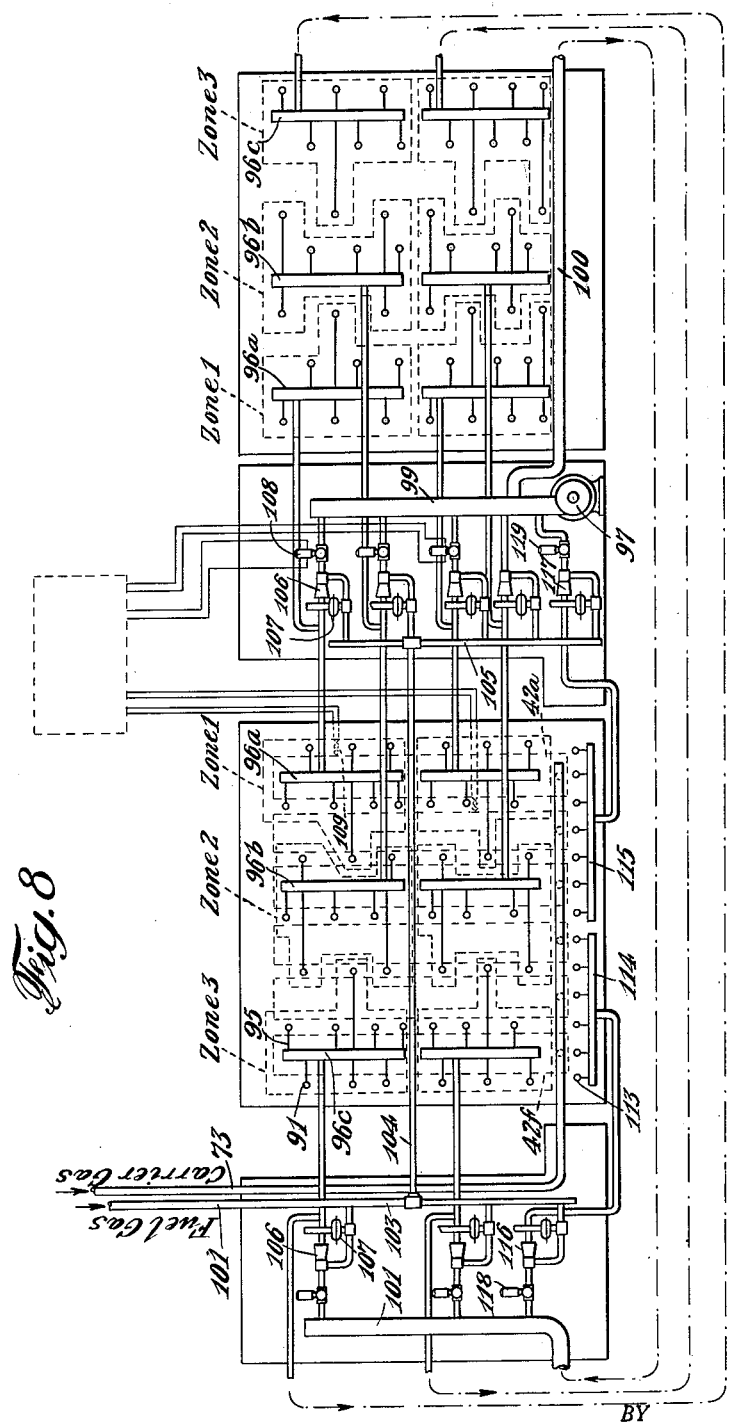

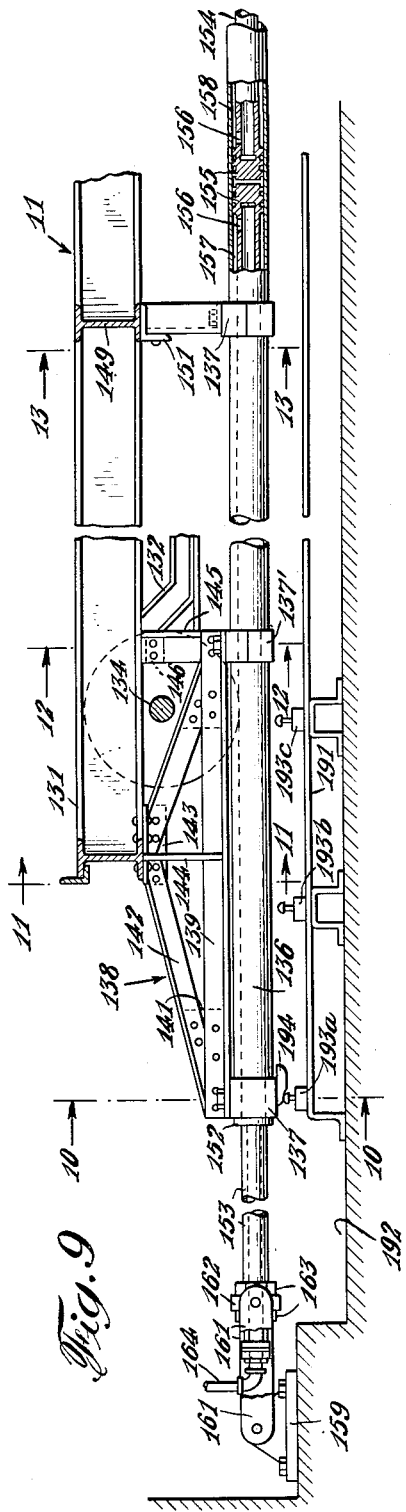

Nov. 29, 1949   H. J. NESS ET AL   2,489,459
METALLURGICAL FURNACE
Filed April 15, 1944   12 Sheets-Sheet 10
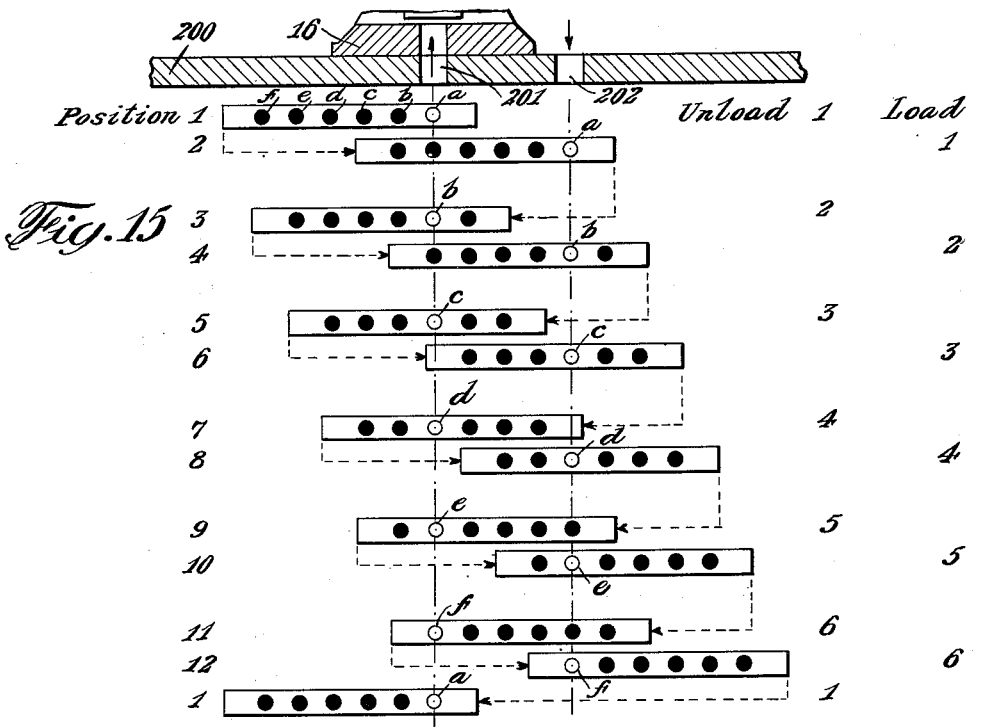
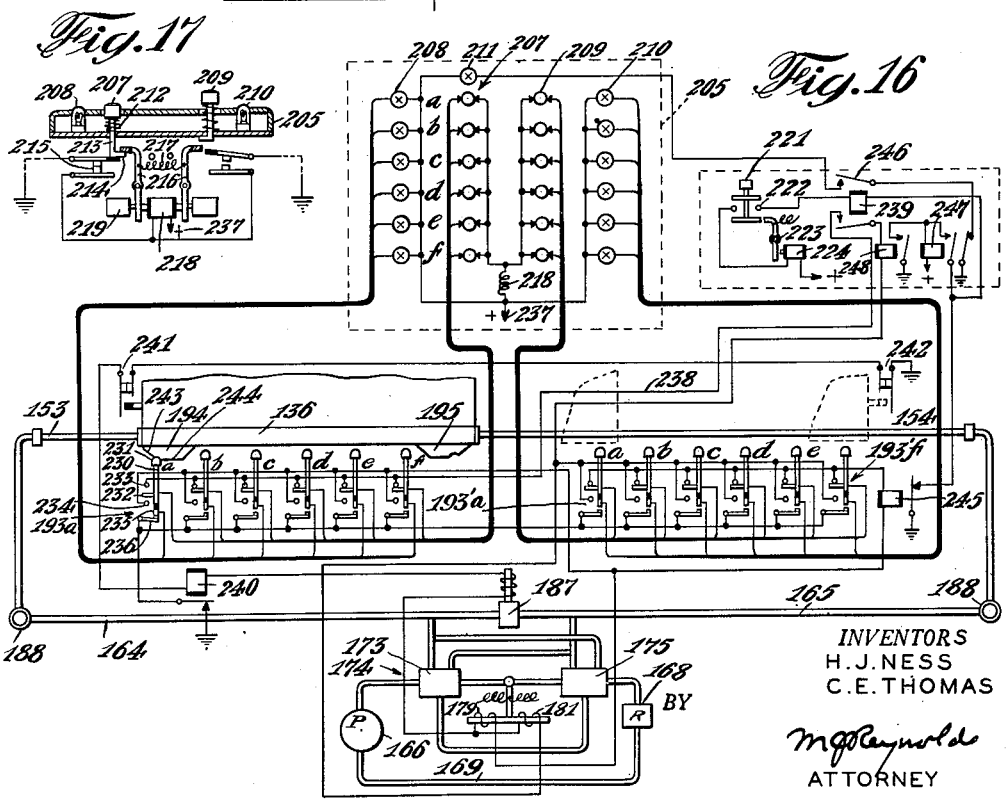
INVENTORS
H. J. NESS
C. E. THOMAS
BY
M. G. Reynolds
ATTORNEY

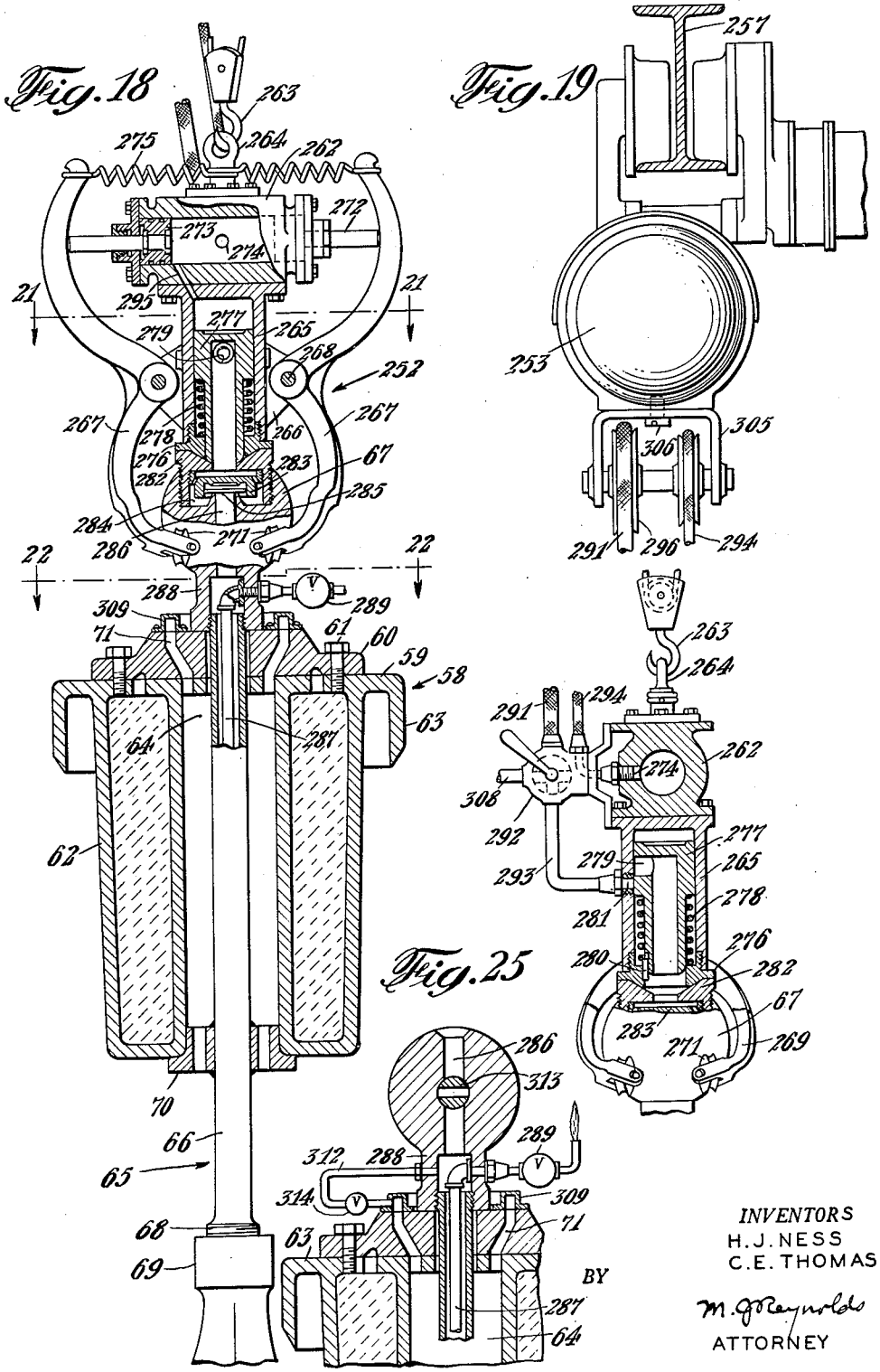

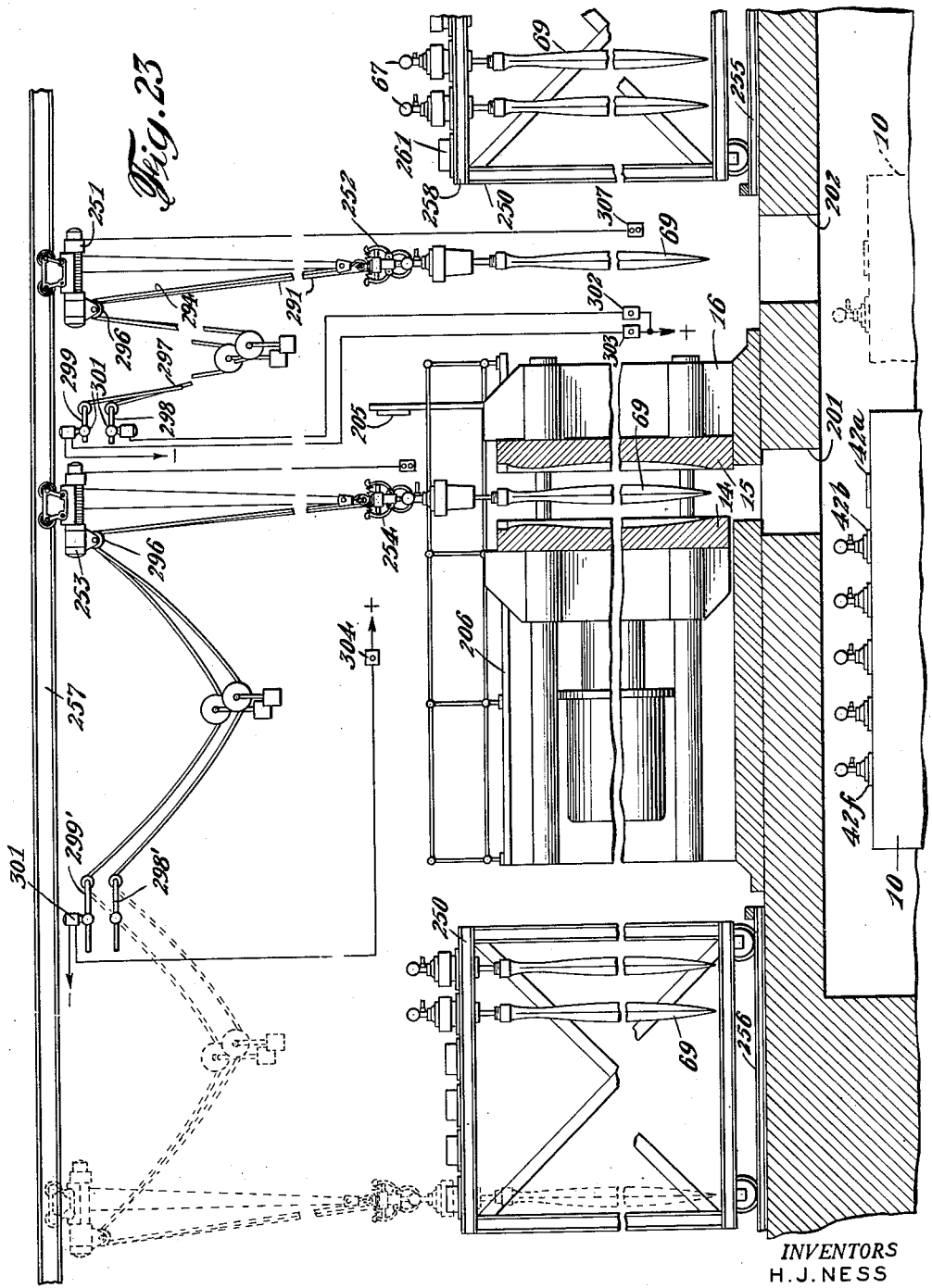

Patented Nov. 29, 1949

2,489,459

UNITED STATES PATENT OFFICE 2,489,459

METALLURGICAL FURNACE

Harold J. Ness, Montclair, and Charles E. Thomas, North Arlington, N. J., assignors to Metallurgical Processes Co., Newark, N. J., a partnership Application April 15, 1944, Serial No. 531,210

10 Claims. (Cl. 266—5)

This invention relates to a metallurgical furnace and more particularly to such furnace in association with a forming press or other work processing mechanism.

More specifically the invention is concerned with the heating of work parts, such as tubes, propeller blanks, etc. in a controlled atmosphere, and the pressing, forging, or other mechanical working of such parts, one of the objects being to effect the transfer of the work parts from the heating position to the working position in a minimum of time and in a highly convenient manner.

Another object is to construct and arrange the furnace and work processing mechanism whereby the heating and processing may be effected in a continuous cycle.

Still another object is to maintain each work part in the controlled atmosphere heating zone during its conveyance to the region of the work processing mechanism.

A still further object is to reduce to a practical minimum the path of movement of the work part from the heating position to the forming position.

A further object is to protect the parts from oxidation during its movement from the heating zone to the forming position.

Another object is to provide a furnace for use in association with work processing mechanism in which a plurality of work parts may be simultaneously heated in a protective atmosphere and in which any of such parts may be removed or additional parts inserted without modification or contamination of the atmosphere to which the remaining parts are subjected.

Another object is to provide such a furnace having a plurality of loading and unloading openings, and being movable to bring any desired opening into predetermined loading and unloading position.

Still another object is to provide such a furnace having a plurality of work holding compartments in which a protective atmosphere may be supplied independently to each compartment.

A further object is to provide simple, convenient and dependable control means for moving said furnace from loading position to unloading position or from one loading or unloading position to another.

Another object is to obtain accurate indexing of said furnace in each position of movement.

Still another object is to provide uniform and accurately controlled heating of said furnace.

A still further object is to provide for the circulation of the controlled atmosphere both around and through the interior of hollow work parts.

Another object is to provide novel work supporting means for such a furnace.

Another object is to provide novel work handling and conveying mechanism for the loading and unloading of said furnace.

Other objects and advantages will hereinafter appear.

In accordance with the present invention the parts to be heated, illustrated in the present embodiment as hollow steel blanks for aircraft propellers, are suspended vertically within individual vertical retorts or muffles contained within the heating chamber of a traveling furnace disposed beneath a suitable press or forming machine and movable so as to bring each muffle, in turn or in any desired order, beneath a suitable press or forming machine opening. The muffles are each closed by individual covers from which the blanks are suspended, and as each muffle is brought into unloading position beneath the die opening of the forming machine, the cover is engaged by a suitable grapple or clutching device and, through suitable hoisting mechanism, the cover and depending blank are raised directly into the dies where the desired forming operation is performed. While the forming operation is being performed the furnace may be moved to bring the empty muffle into a predetermined loading position, where another cover and depending cold blank are lowered therein.

Each of the muffles is provided with a protective atmosphere which may be either neutral or carburizing, as desired, and this atmosphere may be circulated around and, in the case of a hollow blank, through the blank, if desired. This atmosphere comprises either a cracked mixture of a hydrocarbon fuel and air or the products of combustion thereof, to which is added, by suitable vaporizing means, a metallic vapor, such as lithium, the action of which is to eliminate any water vapor in the gaseous atmosphere and to render it non-oxidizing and, in the case of a heat treating atmosphere, to render it non-decarburizing.

The furnace is mounted on a suitable truck operating in a linear direction on guide rails, and the movement is effected preferably by an oil cylinder and associated pump mechanism electrically controlled from any suitable point, as from a control panel situated on or adjacent the forming machine and readily accessible to the operator of the machine.

The above and many other features of the invention will be better understood by reference to the accompanying drawing in which:

Fig. 8 is a diagrammatic view of the external piping for the furnace atmosphere carrier gas and for the air and fuel gas, and the mixing mechanism therefor, showing the four sides of the furnace developed on a single plane;

Fig. 9 is a fragmentary vertical sectional view of the pit and conveying truck showing the manner of attachment of the operating oil cylinder thereto;

Figure 22:
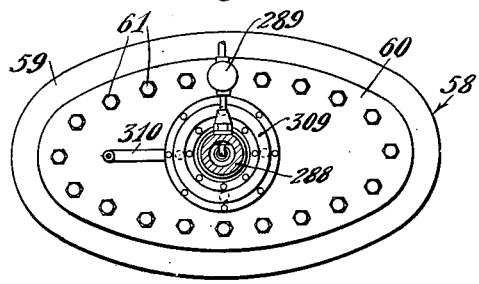
Figure 20:
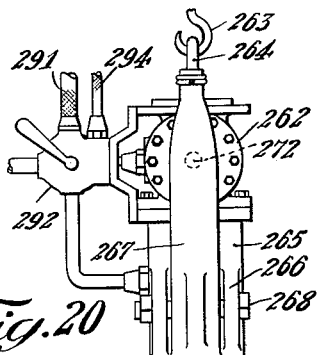
Figure 24:
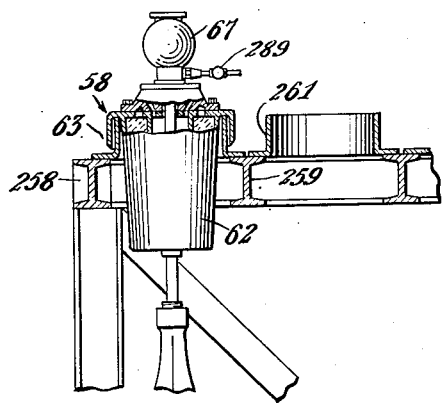
Figure 21:
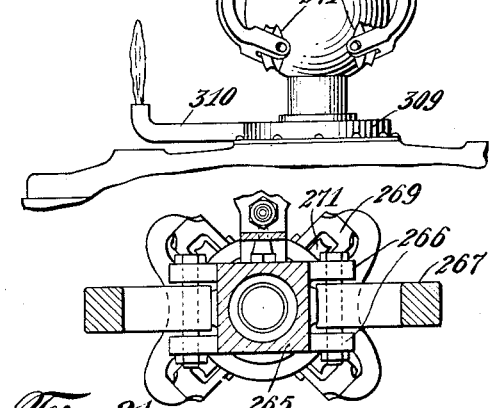

Figs. 10, 11, 12 and 13 are sectional views on the lines 10—10, 11—11, 12—12, and 13—13, respectively, of Fig. 9;

Fig. 14 is a sectional view of the left end of the oil cylinder shown in Fig. 10;

Fig. 15 is a diagrammatic view of the indexing positions of the furnace relative to the loading and unloading positions thereof;

Fig. 16 is a diagram of the indexing control circuits;

Fig. 17 is a detail of the locking means for the panel switches of Fig. 16;

Fig. 18 is a vertical sectional view of the muffle cover, work holding support and detachable gripping device therefor;

Fig. 19 is a vertical sectional view at right angles to Fig. 18 and showing an electric hoist associated with the work holder and gripping device;

Fig. 20 is a view of the work holder and gripping device, as seen from the left of Fig. 18;

Figs. 21 and 22 are sectional views on the lines 21—21 and 22—22 of Fig. 18;

Fig. 23 is a fragmentary vertical sectional view of the pit showing the furnace therein, the press thereabove, and the blank loading, unloading, and conveying mechanism;

Fig. 24 is a fragmentary detail view of the work supporting carriage or rack shown in Fig. 23; and Fig. 25 is a fragmentary sectional view of the muffle cover and work holder, showing an arrangement for circulating the protective atmosphere both around and through the blanks being heated.

Figure 1:
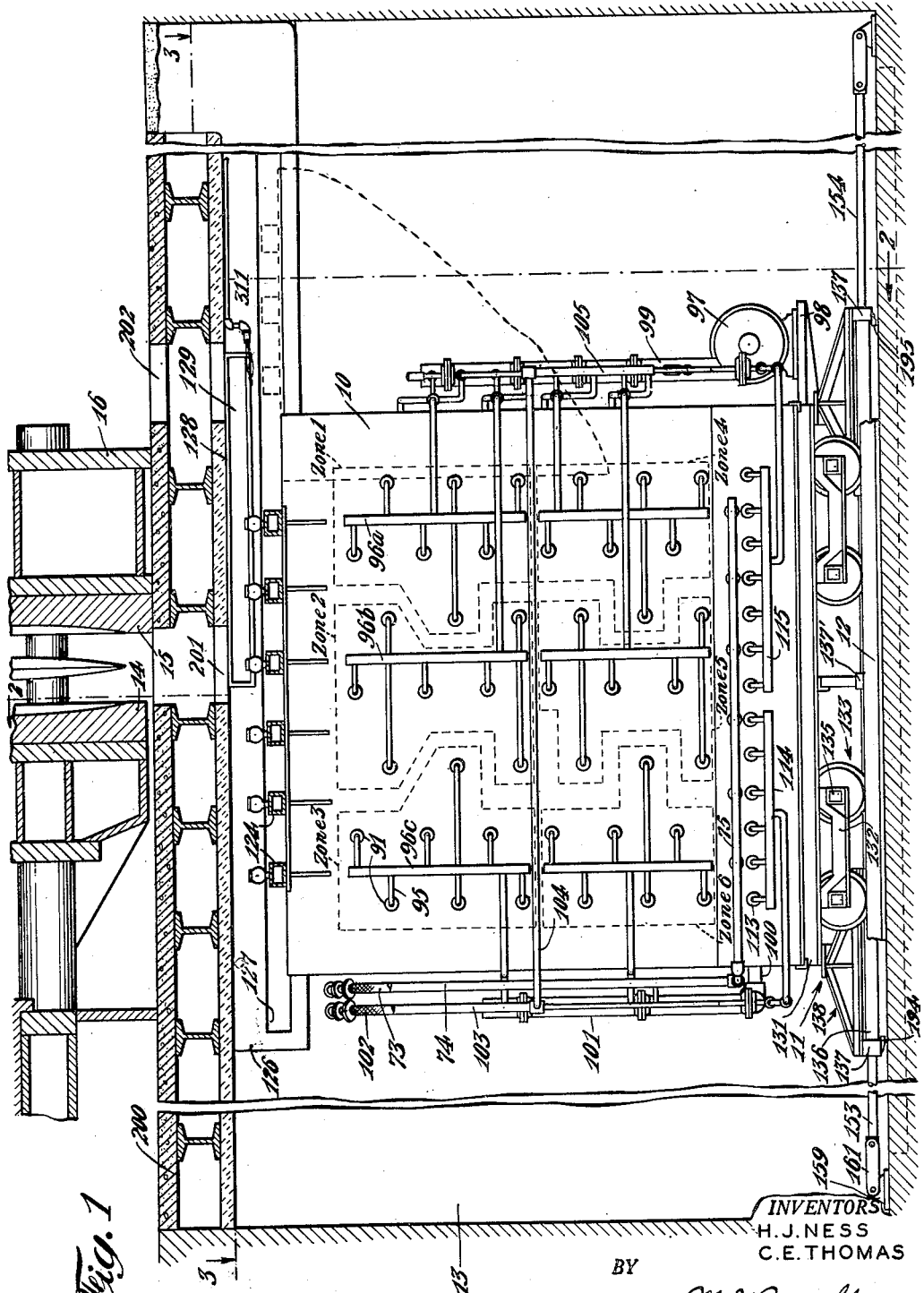
Fig. 1 is a side elevational view of a traveling furnace in association with a forming press, adapted for the shaping of steel propeller blades for aircraft.

Referring first to Fig. 1, the furnace 10 is shown mounted upon a truck 11 adapted for back and forth movement on rails 12 within a pit 13. The furnace is provided with a plurality of individual heating chambers, as will hereinafter appear, adapted to be brought in succession beneath the opening between the die members 14 and 15, of a suitable forming press 16, disposed above the pit 13, so that each work piece may be raised between the dies for forming.

The construction of the furnace 10, the arrangement of the burners therefor, its conveying truck 11, the operating and indexing means for positioning the heating chambers in succession beneath the die opening, and the loading and unloading of the furnace and the operation of the press 16, will be described in the above order.

Furnace structure

Figure 4:
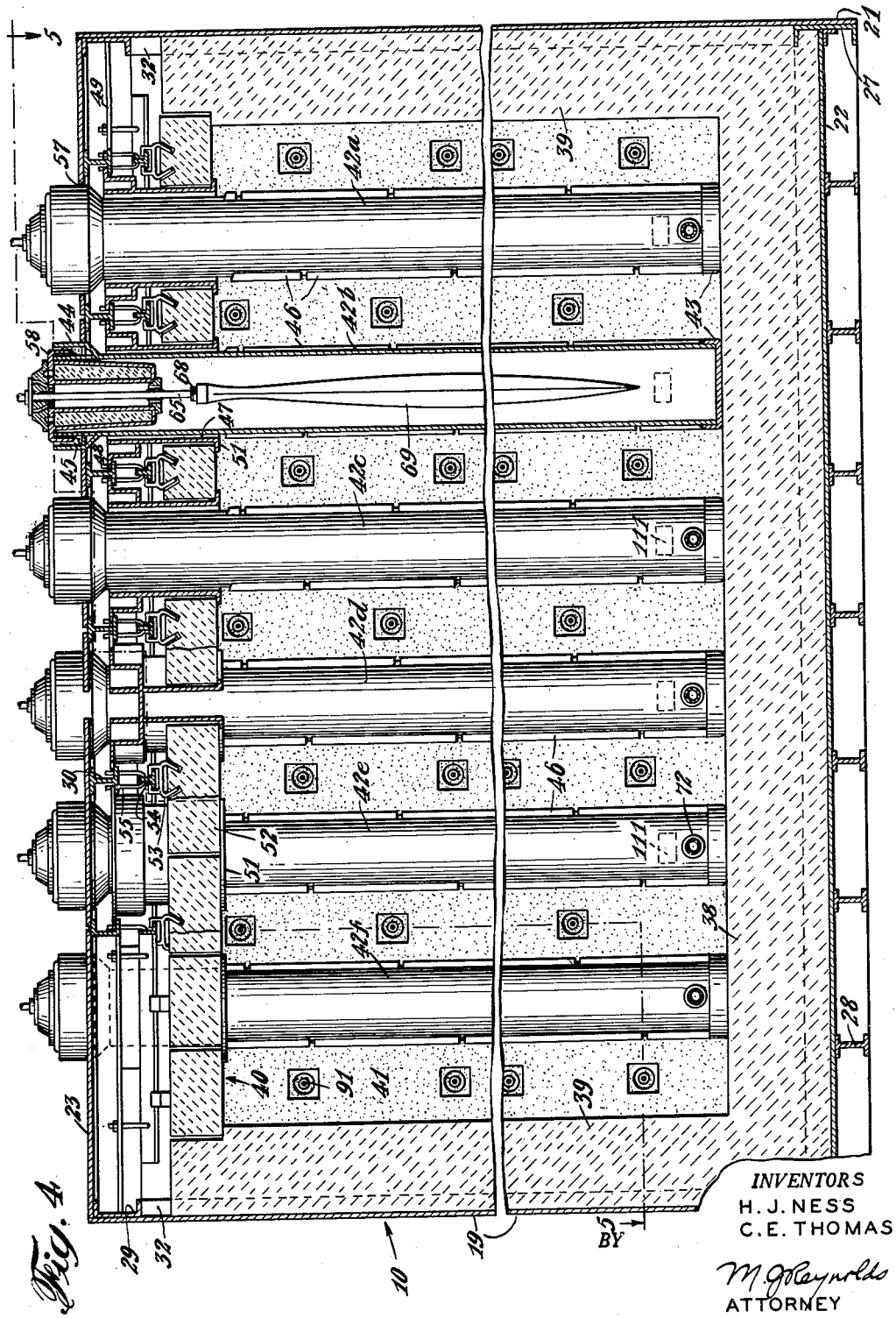
Fig. 4 is a longitudinal vertical sectional view of the furnace taken on the stepped line 4—4 of Fig. 5.
Figure 5:
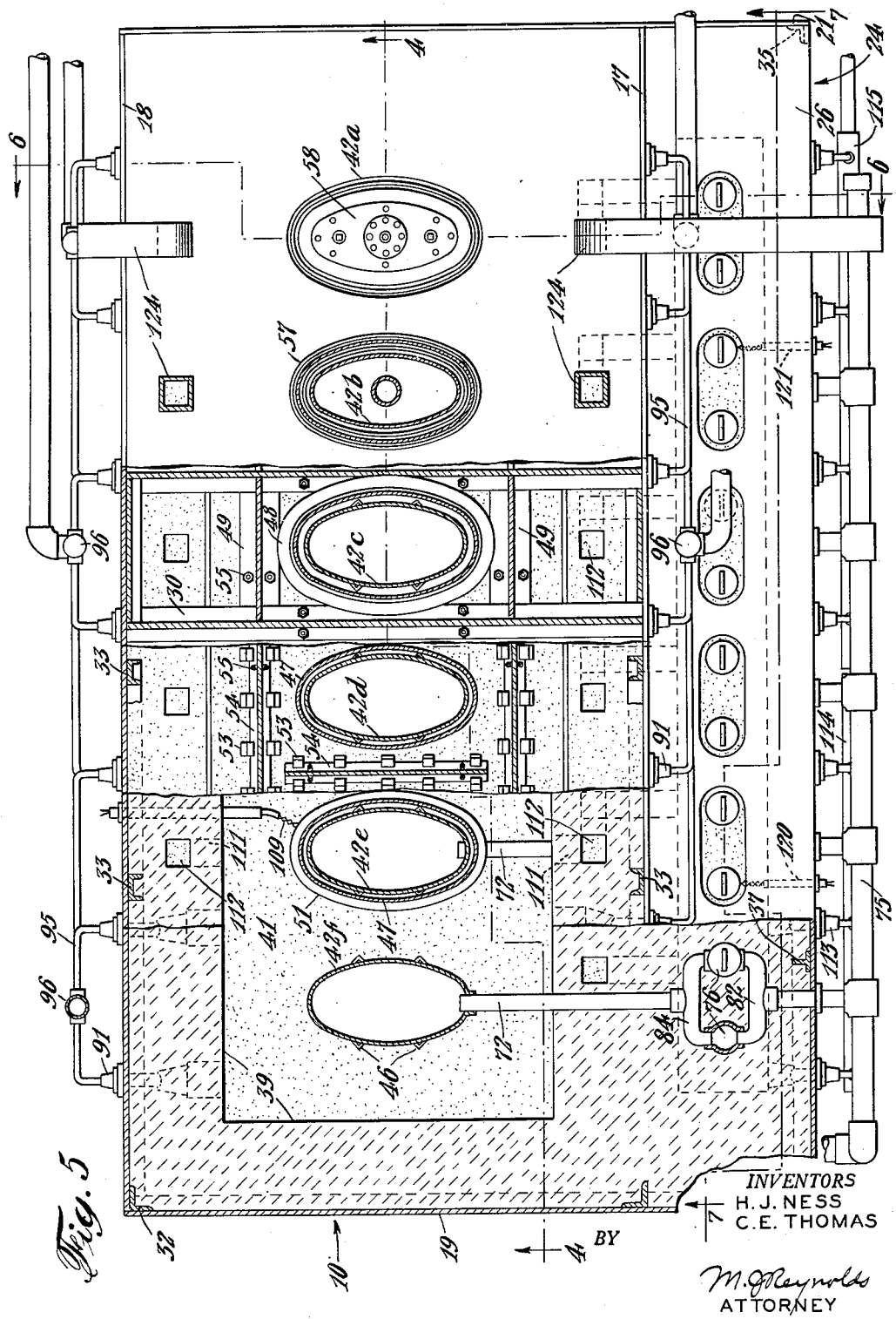
Fig. 5 is a horizontal sectional view on the stepped line 5—5 of Fig. 4.
Figure 6:
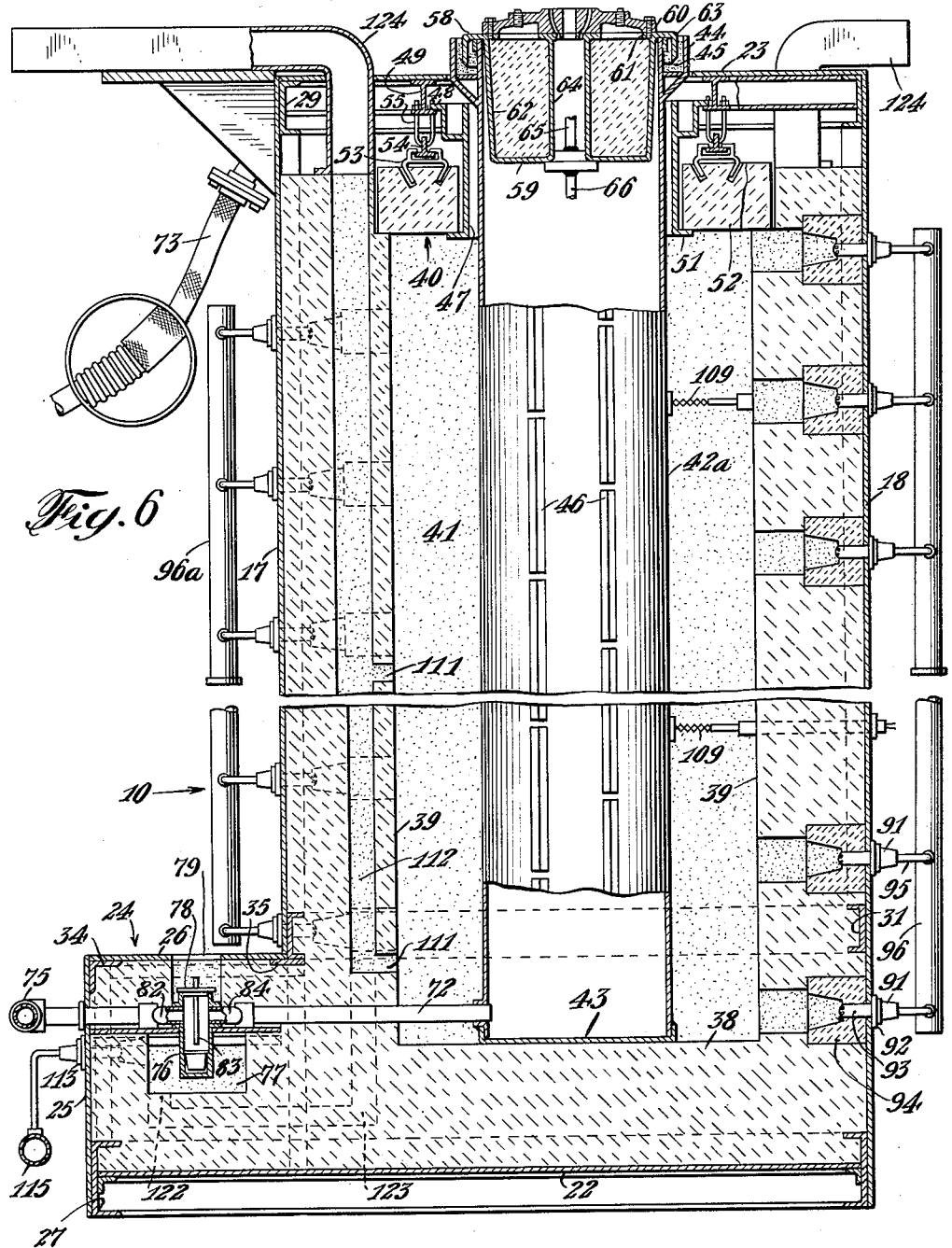
Fig. 6 is a transverse vertical sectional view on the line 6—6 of Fig. 5.

Referring now to Figs. 4, 5 and 6, the furnace is encased in a substantially rectangular shell comprising front and rear walls 17 and 18, respectively, right and left end walls 19 and 21, respectively, a floor plate 22, and a roof plate 23, carried by a suitable structural steel framework. A second rectangular box structure 24 extends along the base of the forward side of the furnace for enclosing the lithium vaporizing chambers. It is defined by the forward end of the floor or base plate 22, extensions of the end plates 19 and 21, and front and top plates 25 and 26, respectively. The framework upon which each of the plates 17, 18, 19, 21, 22 and 23 are mounted comprises a rectangular base composed of channel members 27 and transverse I-beams 28; a second rectangular frame of channel member 29 disposed adjacent the top of the shell and having a number of transverse I-beams 30 extending thereacross; an intermediate rectangular frame of channel members 31; and a number of vertical and diagonal structural members interconnecting the three channel member frames, including the corner angles 32 and intermediate diagonal channel members 33. The plates 25 and 26 of the lithium vaporizing compartments are mounted on a supplemental framework comprising a top horizontal frame composed of angles 34 and plates 35 and a plurality of vertical angles and T-members 36 and 37, respectively.

The base plate 22 is mounted directly on the lower I-beams 28 and carries the main weight of the furnace, comprising the refractory floor 38 and side walls 39. The refractory roof 40 is suspended in part from the top I-beams 30. These refractory walls define a combustion chamber 41 within which are disposed a number of individual vertical muffles 42a to 42f resting directly upon the floor 38 and passing upward through the roof 40.

In the present embodiment, the furnace is designed for the heating of steel propeller blanks of elliptical or airfoil shape. Therefore, in order to conserve material in the muffles, to obtain more even heat distribution to the blanks, and to reduce the over-all length of the furnace, the muffles are shown as substantially elliptical in cross section. However, they may equally well be of any other suitable shape, depending upon the shape of the work to be heated. The body of each of the muffles 42 is of relatively light rolled stock formed and welded into an elliptical tube open at the top and closed at the bottom by a flanged base sheet 43 welded thereto. An elliptical collar 44 surrounds the top of the muffle and is welded thereto, to form a chamber 45 adapted to contain a fluid sealing medium, such as sand. The body of the muffle is reinforced by vertical stiffening angles 46, broken at intervals to prevent warping of the muffle due to unequal expansion of the angle ribs and body of the muffle.

Each of the muffles 42 is loosely surrounded, adjacent its upper end, by an elliptical collar or sleeve 47 having an outwardly extending flange 48 by which it is supported on the lower flanges of the transverse I-beams 30 and longitudinally extending I-beam sections 49 disposed between the I-beams 30. These collars have outwardly turned bottom flanges 51 forming seats for the refractory members 52 forming the roof 40 of the combustion chamber. The roof refractories are further supported by clips 53 carried from inverted T-bars 54 suspended below each of the I-beams 30 and 49 by U-shaped hangers 55. The entire roof 40, except where the peripheral refractory blocks bear on the side walls 39, is suspended from the structural members 30 and 49. The top plate 23, which rests on the beams 30 and 49 and the upper channel member frame 29, has elliptical openings 57 therein through which the muffles 42 extend.

Each muffle is provided with an individual cover 58 comprising a pair of castings 59 and 60, secured together by bolts 61. The lower casting 59 has a hollow central section 62 extending into the muffle 42, adapted to be filled with heat insulating material, and an outer depending flange 63, extending into the sealing medium in the chamber 45. A central passageway 64 (see Fig. 18) is provided through the upper casting 60 and the depending plug portion 62, and extending through this passageway is a work holding member 65 comprising a hollow shank 66 having a spherical head 67 resting on the casting 60, and a threaded sleeve member 68 for attachment of the blank 69 thereto. A spider 70 is secured on the shank 66 so as to clamp the latter member rigidly to the muffle cover. The muffle is exhausted through the passageway 64 and through exhaust vents 71 in the castings 59 and 60.

Figure 7:
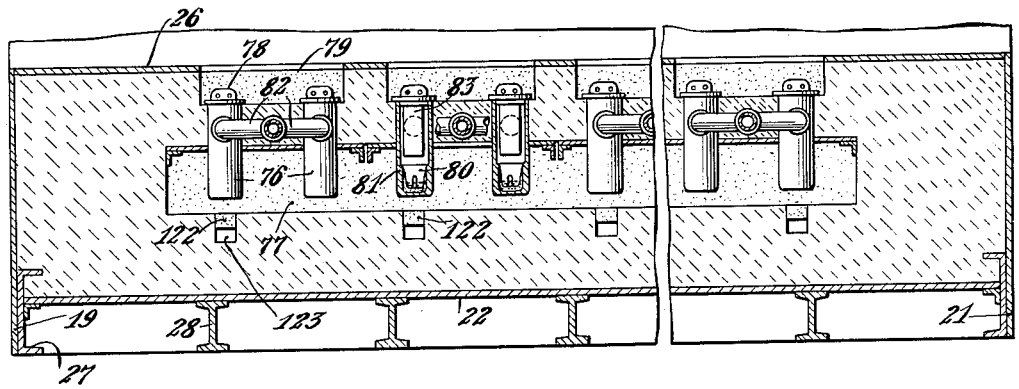
Fig. 7 is a longitudinal vertical sectional view of the lithium vapor generating chambers, taken on the line 7—7 of Fig. 5.

A protective gas atmosphere is admitted into the muffles 42 through the inlet conduits 72 (Figs. 5 and 6). This atmosphere may comprise a suitable carrier gas, such as that resulting from the combustion or cracking of a hydrocarbon fuel and air mixture, to which is added the vapor of lithium or of a compound of lithium, as fully described in Patent No. 2,346,698, granted April 18, 1944, to Harold J. Ness, and entitled "Method of producing protective atmospheres." In the present embodiment, the unlithiated carrier gas is generated in a central gas generator, not shown, and distributed to the furnace through a flexible conduit 73 (Figs. 1–3) and by means of the external piping 74 and manifold 75 to each of the lithium generators 76 (Figs. 5–7) depending within a combustion chamber 77 formed in the forward extension 24 of the furnace casing. In the embodiment shown, two lithium generators 76 are provided for each muffle, the generators being disposed in parallel arrangement in the atmosphere inlet conduits 72. The number of generators may be varied, of course, depending upon the capacity thereof and the volume of gas to be conditioned. Each generator comprises a cylindrical pot having a removable cover 78 accessible through the openings 79 provided in the top plate 26 and the refractory roof of the combustion chamber 77. The lithium or its compound is contained within a replaceable cup 80 supported in the base of the pot 76 by means of a peripheral flange 81, as fully described in the aforesaid patent.

The carrier gas, entering each pair of generators from the manifold 75 through the branches 82, is deflected over the cup 80 by a plate 83 depending from the cover 78, and leaves the generators through the branch conduits 84 joined to the muffled inlet pipe 72. During the passage of the carrier gas through the generators 76, a small portion of the vapor of lithium or of a compound thereof is entrained thereby and serves to eliminate the water vapor from the gas and render it both non-oxidizing and non-decarburizing to the metal being heated in the muffles. The amount of lithium or lithium compound vapor generated in each of the chambers 76 is dependent upon the compound or compounds of lithium contained within the cups 80, the exposed area of the compound, and the temperature thereof. I prefer to employ cups 80 of a diameter of about three inches containing a mixture of lithium chloride and lithium carbonate in the proportion of 40% and 60%, respectively and to maintain the temperature thereof at from 1400° F. to 1800° F., with a rate of flow of approximately 175 cubic feet per hour to each of the muffles 42. A two and one-half ounce charge of the aforesaid compounds in each of the cups 80 will properly condition the atmosphere, for a period of from twelve to fifteen hours, in each of the muffles 42, which in the present embodiment have a height of thirteen feet and a volume of approximately eighteen cubic feet. The relation between the temperature of the compound, its exposed area and rate of gas flow is more fully disclosed in the copending application Serial No. 493,707, of Harold J. Ness, filed July 7, 1943, and entitled "Method of and means for producing a lithiated atmosphere," now abandoned.

The muffles 42, surrounding collars 47, cover casting 49, lithium generators 76, and piping and other metal parts within the combustion chambers 41 and 77, are preferably composed of a heat resisting metal, such as nickel or nickel-chromium-iron alloys.

Burner arrangement

Figure 2:
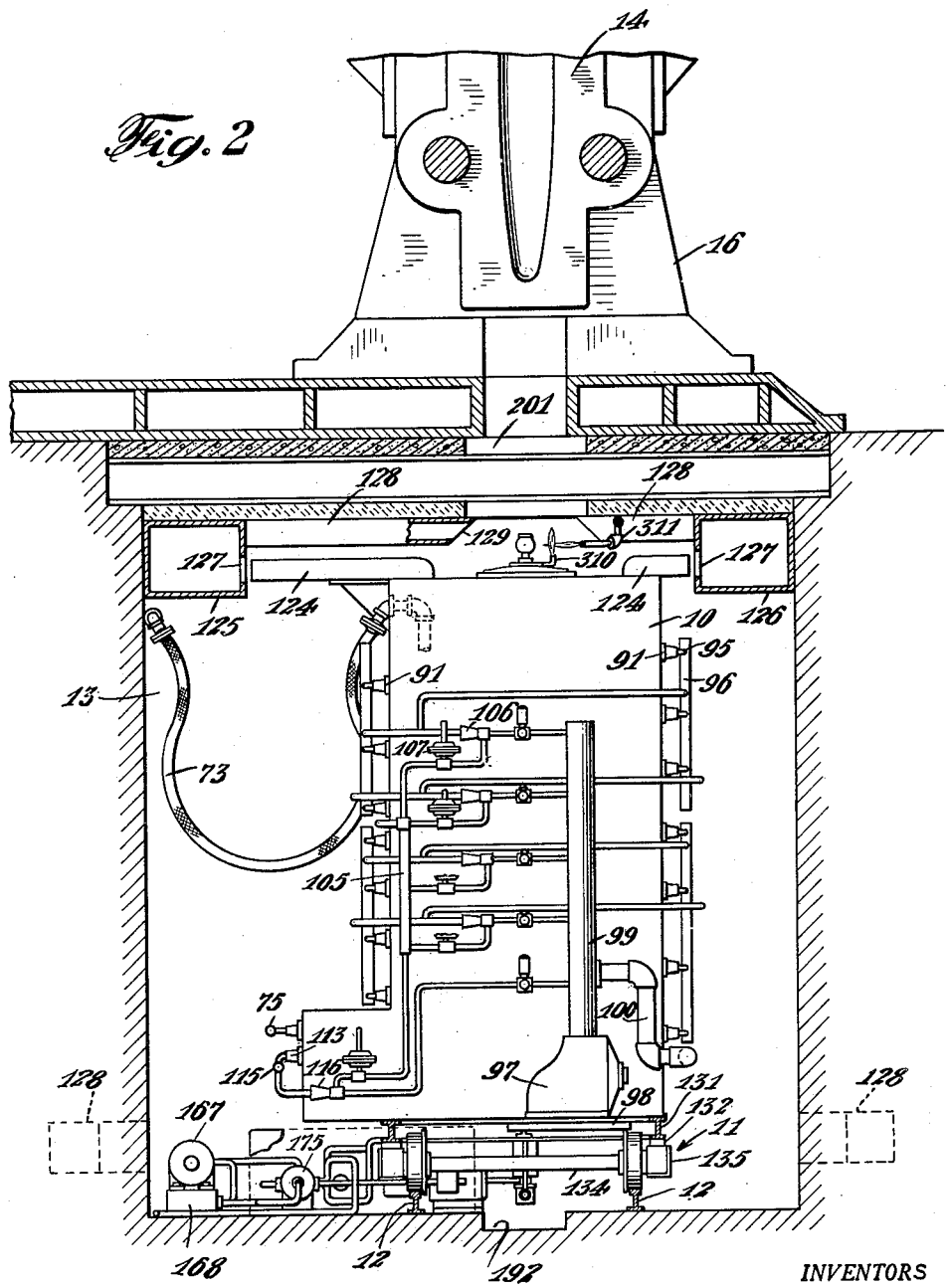
Fig. 2 is an end elevational view as seen from the right, on the line 2—2 of Fig. 1.
Figure 3:
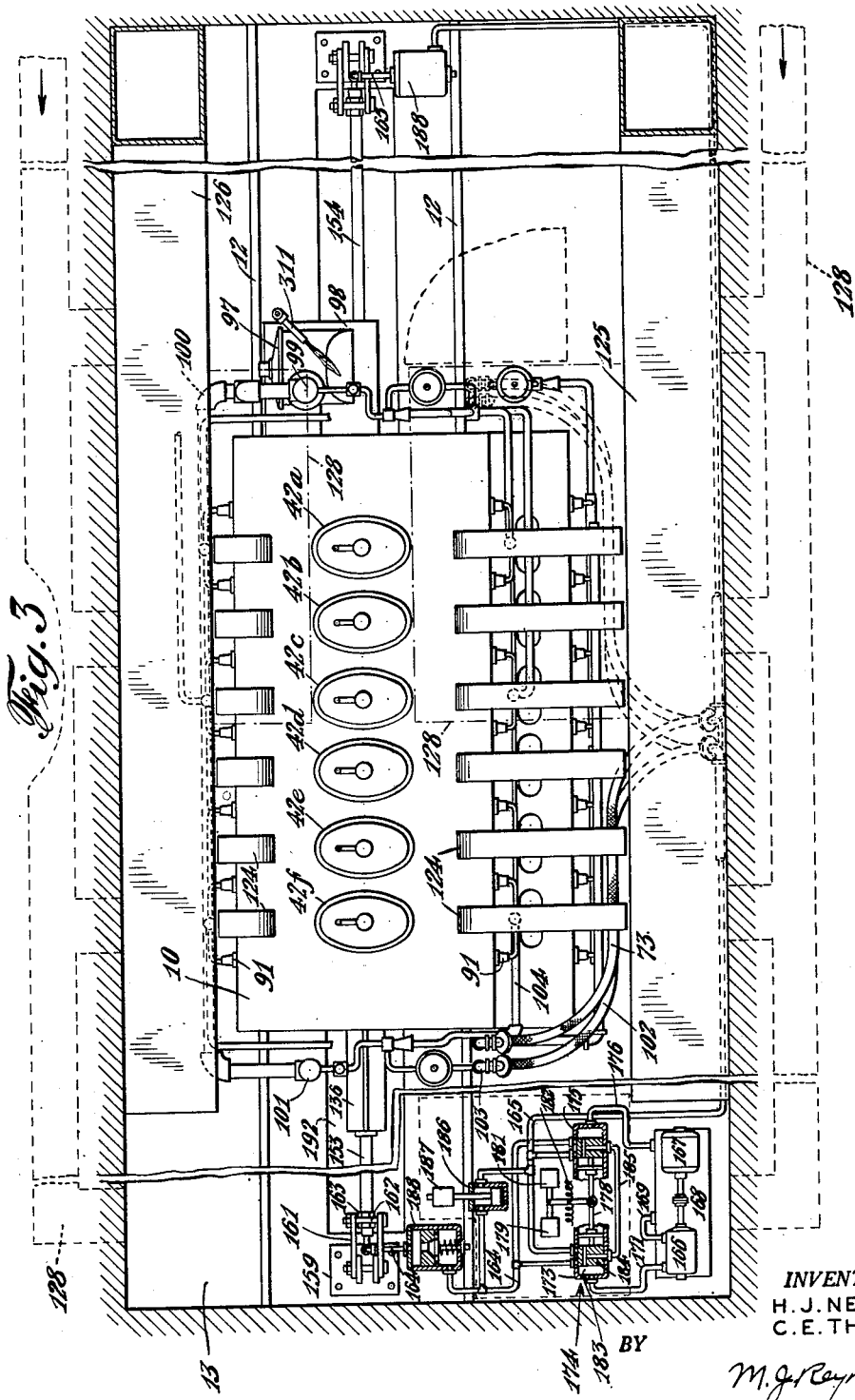
Fig. 3 is a plan view of the furnace and its enclosing pit, as seen on the line 3—3 of Fig. 1.

The combustion chamber 41 is provided with a plurality of burner assemblies 91 (Fig. 6) extending through the front and rear walls thereof in vertical rows and disposed between each of the muffles 42 and between the outer muffles and the adjacent end walls. Each of these burner assemblies comprises a burner bracket 92, having a flanged portion secured to the outer shell plates 17 and 18, a burner 93 carried by the bracket, and a refractory burner block 94 set in the refractory side walls. The burners 93 are supplied with a combustible gas and air mixture by distributing tubes 95 from a plurality of manifolds 96. The distributing arrangement is best shown in Figs. 1, 2 and 3, and the developed view of Fig. 8. Air under pressure for all the burners is supplied by a suitable turbo-blower 97 mounted on a platform 98 carried with the furnace on the truck 11. The blower 97 supplies air under pressure to a standpipe 99 at the right end of the furnace shell and, by means of a conduit 100, to a standpipe 101 at the left end of the shell. Gas is supplied through a flexible conduit 102 (Figs. 1, 2 and 3) to a gas riser 103 at the left end of the furnace, and by a cross conduit 104 to a riser 105 at the right end of the furnace. Air from each of the standpipes 99 and 101 is supplied through suitable orifices, not shown, to a plurality of Venturi mixing devices 106. Gas from the risers 103 and 105 is supplied through zero pressure governors 107 and suitable orifices, not shown, to the throat of the mixing devices 106, whereby the flow of air through the mixing device induces the proper gas flow therein. Each mixing device supplies air and gas in the proper ratio to a pair of the manifolds 96, one at each side of the furnace and similarly positioned relative to the muffles 42. The arrangement of each such pair of manifolds and their associated burners are in zones, there being six such zones in the embodiment shown, three for the upper half of the muffle group and three for the lower half thereof. Referring to Fig. 8, the burners included in each zone are enclosed in dotted lines, zones 1, 2 and 3 comprising the burners associated with the front and rear manifolds 96a, 96b and 96c, respectively. Zones 4, 5 and 6 comprise similar groupings of the burners in the lower half of the furnace. The burners in each zone are controlled by an electric valve 108 in the air supply line to each of the mixing devices 106. The valves 108 are actuated under control of a thermocouple 109, one of which is suitably located in the combustion chamber adjacent each of the designated zones. Since there are six zones and six muffles, the thermocouple which controls each zone is in contact with a different muffle. This zone 1 is controlled by a couple associated with the upper part of muffle 42a; zone 4 by a couple associated with the lower part of muffle 42b. Zones 2 and 3 are similarly controlled by couples associated with the upper half of muffles 42c and 42e and zones 5 and 6 by the lower half of muffles 42d and 42f, respectively. It will be noted that each manifold 96 feeds one or more burners in the area chiefly fed by an adjacent manifold, so as to provide an overlapping of the zones. The purpose of this is to reduce the frequency of the off and on cycles of the burners in each zone. For instance, should the furnace in the area heated by the burners fed by the manifold 96b attain its desired temperature, so as to cause these burners to be extinguished, the drop in temperature of this area is retarded by the burners of manifold 96a and/or 96c which overlap into this area. The amount of this overlapping of controlled areas may be varied, of course, but should be restricted so as to prevent a continued increase in temperature in any area after the primary heat source for that area has been interrupted. It will be noted that the burners at the forward side of the furnace are offset vertically from those at the rear, whereby the forward burners fire between the rear burners in the same vertical plane. By vitue of this arrangement and the relatively large number of small burners employed, and the overlapped arrangement of the control zones, extremely uniform heating of the muffles is obtained.

The combustion chamber 41 is exhausted (Figs. 4–6) through a plurality of ports 111 and passageway 112 in the refractory side walls. These ports are disposed between each vertical row of burners on each side of the furnace at two elevations, one set, as best shown in Fig. 6, being adjacent the floor of the furnace below the burners contained in the lower zones 4, 5 and 6, and the other set being disposed beneath the burners contained in the upper zones 1, 2 and 3. This arrangement of burners and exhaust ports causes the products of combustion to sweep around and down across the muffles 42, as well as across the refractory walls of the combustion chamber, in a turbulent path whereby the maximum heat is extracted therefrom.

The combustion chamber 77 for heating the lithium generators 76 is provided with a group of burner assemblies 113 similar to the burner assemblies 91. These burners are disposed in a horizontal row along the front of the combustion chamber, between each of the vaporizing pots 76 and to the left and right, respectively, of the left and right end pots. They are supplied with a combustible mixture of fuel and air by two manifolds 114, 115, having associated mixing devices 116 and 117, respectively, disposed at opposite ends of the furnace. The air supply line for each of these mixing devices is provided with electrically operated valves 118, 119, respectively, controlled by separate thermocouples 120, 121 (Fig. 5). The valves 118, 119 serve to reduce the air and hence the gas flow to the manifolds 114, 115 when the generators are up to the desired temperature.

The combustion chamber 77 is exhausted through ports 122 spaced along the forward side of the combustion chamber floor, intermediate each pair of vaporizing pots, and these ports communicate, by passageways 123, with the vertical exhaust passageways 112.

At their upper ends, the exhaust passages 112 are continued by metal conduits 124 passing upwardly through the top plate 23 and thence extending laterally to adjacent the forward and rear ventilating conduits 125 and 126. These conduits are supported against the upper front and rear walls of the pit 13 and are provided with an elongated opening 127 of a length to register with the open ends of the exhaust conduits 125 and 126 in the full longitudinal movement of the furnace. The vertilating conduits extend from the pit through a suitable wall of the building and are provided with exhaust fans of sufficient capacity to carry away, not only the products of combustion, but sufficient air from the pit 13 to maintain a comfortable temperature therein. Fresh air is admitted into the pit by suitable conduits 128 in the side walls thereof.

A lateral duct 128 is provided for each of the conduits 125, 126, having openings 129 disposed adjacent each side of the line of muffles 42 and extending from a point beneath the opening of the press 16 to a point to the right of the press, as seen in Fig. 1, whereby to exhaust, from above the furnace, the atmosphere released from the muffles 42 during the open periods thereof between the unloading and loading operations and during the interval of movement of the furnace from the unloading to loading position as will more fully appear.

*Traveling carriage and operating mechanism*

The traveling carriage 11 upon whch the furnace 10 is mounted for back and forth movement beneath the forming press 16 comprises a suitably cross-braced I-beam frame 131 carried on the bearing bars 132 of a pair of trucks 133. The truck wheel shafts 134 are carried in suitable antifriction bearings 135 and operate on the machined rails 12. The carriage 11 is propelled backward and forward on the rails 12 by manipulation of the oil pressure on opposite sides of a stationary plunger contained within a cylinder 136 carried beneath the carriage 11. The cylinder 136 has fixedly secured thereto, at each end and at a number of intermediate points, the blocks 137, as by clamping or welding. The outer pair of blocks 137, at each end of the cylinder, are bolted to a structural truss 138 depending from the I-beam frame 131. As best shown in Figs. 9 to 12, these truss structures comprise a pair of angle members 139, extending between the end pairs of blocks 137 and securely bolted thereto, fish plates 141 riveted to the upturned flanges of the angles 139, and pairs of diagonal angles 142, riveted to the fish plates 141 and to the depending flange of an angle 143, in turn riveted to one flange of the I-beam frame 131. Transverse gusset plates 144 are welded to the angles 139 and to the frame 131.

A vertical angle 145 is riveted between the vertical flanges of the angles 139 and to an angle 146 secured to the frame 131 in vertical alignment with the inner block 137 of each pair.

Between the outer pair of blocks 137 is an additional block 137' by which the cylinder is further anchored to the frame 131 by the transverse angle bracket 148, secured to a cross I-beam 149 by angle sections 151. Of course, any other suitable means may be provided for securely fixing the cylinder 136 to the carriage.

The cylinder is closed at each end by a suitable stuffing gland 152 through which the hollow piston shafts 153 and 154 extend. These shafts are anchored at opposite ends of the floor of the pit 13 and terminate within the cylinder 136 in pistons 155 spaced closely adjacent to each other. The shafts 153, 154 each have a port 156 by which oil may be pumped into or from the chambers 157 and 158 provided between the shafts 153, 154 and the inner wall of the cylinder.

The anchorage for the outer ends of each of the piston shafts comprises a bracket 159 anchored to the floor of the pit, a pair of spaced links 161 pivoted thereto and to a spacer 162 through which the shaft passes and to which it is clamped by oppositely disposed nuts 163 threaded on the piston shaft. The pivoted link connection permits variation in the horizontal alignment of the cylinder 136 and the anchor brackets 159 in the various positions of travel of the carriage.

Oil supply conduits 164 and 165 are secured to the free ends of the shafts 153 and 154 respectively, whereby suitable pressure may be produced in either end of the cylinder 136. The arrangement of the oil lines and pumping mechanism is best shown in Fig. 3. Oil pressure is supplied by a pump 166 driven continuously by a motor 167, the pump and motor being mounted upon a suitable oil reservoir 168. The inlet port of the pump is connected by a conduit 169 with the reservoir 168 and the outlet port is connected by a conduit 171 to the outlet valve 173, of suitable oil flow direction reversing valve mechanism 174. The inlet valve 175 of the reversing mechanism is connected to the reservoir 168 by a conduit 176. Each of the valves 173 and 175 is provided with pistons connected by a common shaft 178 operated either to the left or to the right by solenoids 179 and 181, respectively, and returnable to a central position, as shown, when both solenoids are deenergized, by centering springs 182. The pistons 177 each have an opening 183 therethrough and a branch opening 184 which, in the central position of the piston, is in registry with a connecting conduit 185. In this central position, the pistons close a pair of ports communicating with the conduits 164 and 165, extending to the left and right ends, respectively, of the shafts 153 and 154 of the carriage operating cylinder. A normally closed by-pass valve 186, operated by a solenoid 187, is connected between the conduits 164 and 165. Each of the conduits 164 and 165 is also provided with a pressure retaining valve 188 adapted to permit the unrestricted flow of oil into the shafts 153 and 154 but restricting the flow in the opposite direction so that a predetermined minimum pressure will be maintained at all times within each end of the cylinder 136.

When the carriage is at rest, with the by-pass valve 186 open, the pressure in the opposite ends of the cylinder 136 will be equal. The valves 173 and 175 are also in their midposition at this time, disconnecting the conduits 164 and 165 from the pump 166 and reservoir 168. The continuously operating pump, at this time, draws oil from the reservoir by way of the conduit 169 and delivers it back to the reservoir through the circuit comprising the conduit 171, passages 183 and 184 of valve 173, conduit 185, passages 183 and 184 of valve 175 and conduit 176. When it is desired to move the carriage to the left, the solenoids 187 and 181 are energized simultaneously, to close the by-pass valve 186 and move the pistons of valves 173 and 175 to the right. The pump 166 now delivers oil to the left end of the cylinder 136 through the conduit 171, valve 173, conduit 164 and valve 188 to the hollow shaft 153, and by the port 156 to the left end of the cylinder 136, forcing the same and its attached carriage to the left. During this movement, as the pressure in the right end of the cylinder builds up above the predetermined minimum, as determined by the valve 188 in the conduit 165, the oil is forced therefrom and through the conduit 165, valve 175, and conduit 176 to the reservoir 168.

When the carriage reaches its desired leftward position, the solenoids 187 and 181 are deenergized, as will hereinafter appear, opening the by-pass valve 186 and centering the pistons of valves 173 and 175. This latter operation disconnects the pump from the conduits 164 and 165 and the opening of the by-pass valve 186 permits the pressure in the opposite ends of the cylinder 136 to equalize.

If it is desired to move the carriage to the right, the solenoids 187 and 179 are energized, the latter moving the pistons of valves 173 and 175 to the left and establishing a connecting path from the pump 166 to the cylinder shaft 164 through conduit 171, passage 183 of valve 173 and conduit 165, the oil being returned to the reservoir 168 from the left end of the cylinder through conduit 164, passage 183 of valve 175 and conduit 176.

Thus it will be noted that the carriage and the furnace supported thereon may be moved backward and forward in the pit 13 by suitable energizing and deenergizing of the solenoids 187 and 179 or 181. The control circuits for these solenoids are completed by a series of manually operated control switches, later to be described, one of which is provided for each position into which it is desired to move the carriage, and these circuits are interrupted, when the carriage reaches such position, by means carried by the furnace which searches for the energized control circuit. Referring to Fig. 9, a bracket 191 mounted in a recess 192 in the floor of the pit 13, carries a series of switches 193a, b, c, etc. Cam members 194 and 195 (Figs. 1, 9 and 16), carried by the left and right end blocks 137 of the cylinder 136 are arranged to engage and open the switches 193a, b, c, etc., one after the other as the carriage moves in either direction, until it finds the one through which the solenoids 187 and 179 or 181 are energized, whereupon it opens the circuit thereto to arrest the motion of the carriage, as will more fully appear.

Muffle indexing

In the operation of the furnace, a single work piece or blank 69 is placed in each of the six muffles and retained therein until they have attained the proper working temperature. Each of the work parts is supported from the muffle cover and is removable from the muffle with the cover. As each blank is removed, for forming by the press 16, a new or cold blank is inserted in the muffle, the cycle of operation being timed so that by the time the remaining five blanks have been removed and formed, the new blank will be at the proper temperature for forming. The operation is thus continuous. The unloading position of the furnace is, of course, directly beneath the dies of the forming press, and the loading position is slightly to the right of the press, as viewed in Figs. 1 and 23.

The complete cycle of movement of the furnace is shown in Fig. 15, in which the roof 200 of the pit 13 is shown with two openings 201 and 202, the former being the unloading opening disposed beneath the press 16 and the latter being the loading opening. The furnace is shown diagrammatically in each successive position, the light circle representing, in each position, the particular muffle into which loading or from which unloading is to be effected, and the dark circles representing the remaining muffles. Assuming that all the muffles contain a blank undergoing heating and that the blank in the rightmost muffle is in condition for transfer to the forming press, the furnace is first indexed to bring this muffle, indicated as muffle $a$, beneath the floor opening 201. This is indicated in Fig. 15 as position 1. With the furnace in this position, the spherical head 67 of the work holder 65 of muffle $a$ is engaged by a suitable connection hereinafter to be described, and the muffle cover and suspended blank are raised to bring the blank between the dies of the press 16, and the forming operation conducted. Immediately upon removal of the blank from the muffle, the furnace is indexed to the right to position 2 so as to bring muffle $a$ beneath the loading opening 202 where a new blank and muffle cover are lowered into place. During the loading operation the blank previously removed from the furnace is formed in the press and removed therefrom to a suitable rack, hereinafter described. After the loading of muffle $a$ has been completed, the furnace is indexed back to the left into position 3 so as to bring the muffle $b$ beneath the press. In like manner the furnace is successively indexed into positions 4 to 12 to permit loading of muffle $b$ and the unloading and loading of muffles $c$ to $f$, in succession. The cycle of operation is so timed that by the time muffle $f$ is reloaded, the blank previously loaded into the muffle $a$ is ready for the pressing operation. If the required heating time for each blank is one half hour, then a press operation is effected every five minutes. After muffle $f$ is loaded, the furnace is returned to position 1 and the complete cycle repeated.

The control circuits for effecting the indexing of the muffle are shown in Fig. 16. Referring to this figure, a panel switchboard 205 is located conveniently to the press operation, preferably on the deck 206 (Fig. 23) of the press. This switchboard is provided with a vertical row 207 of six unloading position push button switches and associated indicator lamps 208, and a vertical row 209 of loading position push button switches and associated lamps 210, one push button thus being provided for each unloading and loading position of the furnace. The unloading row of push buttons 207 also has a common ready indicating lamp 211. The construction of the switch panel is shown in Fig. 17. The buttons 207 and 209 are normally elevated by springs 212. The stems 213 of each switch extend through the panel 205 where they are provided with lock projections 214 and switch contacts 215. A pair of locking bails 216, normally held out of the path of the projections 214 by a spring 217, are adapted to be operated by a magnet 218, the arrangement being such that upon the depression of any of the buttons 207 or 209, the magnet 218 is energized to lock the operated button depressed and bar the depression of any of the remaining buttons. A dashpot 219 is connected to each of the locking bails 216 to delay the unlocking movement thereof, for a reason which will subsequently appear.

A single push button switch 221 is also arranged adjacent the loading position for operation by the loading operator upon completion of the loading operation. This switch serves to complete a circuit to the ready signal lamp 211 and to prepare a circuit for effecting movement of the furnace to one of the unloading positions upon subsequent operation of one of the panel switches 207. The switch 221 has a set of contacts 222 and a locking lever 223 with its operating magnet 224.

The furnace carriage is provided, as previously stated, with cam members 194 and 195 adjacent the left and right ends thereof. The cam 194 is adapted to engage the series of six unloading position indexing switches 193$a$–$f$ and the cam 195 is adapted to engage the six loading position indexing switches 193'$a$–$f$. Each switch comprises a stem 230 having a cam head 231. The stem has a blade 232 normally engaging a contact 233 and movable by the cam 194 or 195 to engage a contact 234, and a tip 235 arranged to engage a contact 236.

One terminal of each of the switches 215 of push buttons 207 and 209 is connected to battery 237 through the winding of locking magnet 218. The opposite terminals of the switches of push buttons $a$ to $f$ of row 207 are connected to the blades 232 of the switches 193$a$ to $f$, respectively, and the opposite terminals of the switches of push buttons $a$ to $f$ of row 209 are similarly connected to the blades of switches 193'$a$ to $f$, respectively. Likewise the lamps 208 are connected to the battery 237 at one side, and at the opposite side to the tips 235 of switches 193$a$ to $f$. Lamps 210 are similarly associated with switches 193'$a$ to $f$. The upper contact 233 of all switches 193 are connected by one common conductor 238 through the lower armature and make contact of a relay 239 associated with the switch 221 and thence in series through the solenoid 181 of the reversing valve mechanism and solenoid 187 of the by-pass valve 186, winding of relay 240 and normally closed contacts 241 and 242, to ground. The lower contacts 234 of switches 193 are similarly connected through the pump control solenoid 179, by-pass control solenoid 187, relay 240 and contacts 241 and 242, to ground. The contacts 236 of all switches 193 and 193' are connected in common to ground through the armature and break contact of relay 240. The upper contacts 233 of switches 193' are all connected through the pump control solenoid 179 and the lower contacts 234 are connected through the pump control solenoid 181, these circuits joining, as previously described, through solenoid 187, magnet 240, and contacts 241, 242, to ground.

In describing the operation of the indexing control circuits, it will be assumed that the furnace is in position 1 of Fig. 15 for the unloading of muffle 42$a$. In this position of the furnace the cam 194 will have its first lobe 243 in engagement with the head of switch 193$a$ partially depressing the same so as to engage contact 236 with the tip 235 and with contacts 233 and 234 disengaged from the blade 232. A circuit will thus be closed from battery 237, lamp 208a, tip 235 and contact 236 of switch 193a and back contact of magnet 240 to ground, indicating to the press operator, by illumination of the lamp 208a, that the a muffle is in unloading position. As soon as the muffle is unloaded, the operator depresses the a loading position switch 209, completing a circuit from battery 237, winding of locking magnet 218, contacts of switch 209a, blade 232 and contact 233 of switch 193'a, solenoids 179 and 187, magnet 240 and contacts 241, 242, to ground. The energizing of solenoid 179 operates the reversing valve mechanism 174 to deliver oil to the right end of the cylinder 136 to move the furnace to the right, and solenoid 187 closes the by-pass valve 186. As this movement to the right continues, the cam 195 moves into engagement with the head of switch 193'a, depressing it to open the circuit just traced at the contact 233. This interrupts the feeding of oil to the cylinder 136 and the carriage is brought to rest. Should it overtravel, the high lobe 244 of cam 195 engages the switch 193'a to further depress the same to close the contacts 232, 234. This operates the opposite pump solenoid 181 to cause pressure to be applied to the left end of the cylinder 136 to return the furnace to the left until the low lobe 243 is again engaged with the switch 193'a to reopen contacts 232, 234. Should the furnace overtravel in the reverse direction, contacts 232, 233 again close, again moving the furnace to the right. Thus it hunts back and forth until it finally centers to rest with both contacts 233 and 234 open and contacts 235, 236 closed. During this back and forth movement, release of locking bails 216 of the panel switch 209 is prevented by the dashpots 219. Shortly after the centering of the furnace with muffle a in loading position, the bails 216 release the depressed key, permitting it to return to unoperated position. During the back and forth hunting of the furnace, the magnet 240 alternately energizes and deenergizes, as contacts 233 and 234 are made and broken, causing panel indicator lamp 210a to flash, over a circuit similar to the one previously traced for lamp 208. As soon as the furnace comes to rest in its properly indexed position, the lamp 210a glows steadily, contacts 234, 236 only of switch 193'a being closed at this time, and magnet 240 consequently being deenergized.

After the loading of the a muffle is completed, the loading operator depresses his switch 221, this switch locking up over a circuit extending from battery through the winding of relay 224, contacts 222, winding of relay 239 and back contact and armature of relay 245, to ground. The closing of the lower contacts of relay 239 prepares the circuit over conductor 238 for the upper contacts of switches 193a to f so that upon operation of any one of the unloading panel switches 207, a circuit will be completed to effect leftward movement of the furnace into one of the unloading positions. The closing of the upper contacts 246 of relay 239 completes a circuit from ground through the outer back contacts of a relay 247, contacts 246 and ready signal lamp 211 to battery 217 to operate the lamp 211 and thus to indicate that the loading operation is completed. The circuit through the winding of relay 239 remains energized until one of the loading panel switches 209 is closed, whereupon relay 245 is energized to interrupt the circuit and release the switch 221 to open its contacts. This does not occur, however, under normal operation until after the furnace has been returned to an unloading position and one of the muffles has been unloaded. If the press operator, noting the ready signal lamp 211, now desires to move the furnace into position to unload the b muffle, he depresses button 207b which completes a circuit to the oil pump control mechanism and starts the movement of the furnace to the left. This circuit may be traced from battery 237, locking magnet 218, panel switch contact 207b, blade 232 of cam switch 193b, upper contact thereof, conductor 238, front contact and lower armature of relay 239, winding of relay 248, solenoids 181 and 187 of the pump control mechanism, winding of relay 240 and switches 241 and 242, to ground. Solenoids 181 and 187 cause the oil pressure to be applied to the left end of cylinder 136 and the furnace moves in this direction until the contacts 232, 233 of cam switch 193b are opened by cam 194. Operation of relay 248 in the circuit traced causes the relay 247 to operate, thus to interrupt, at its outer contacts, the circuit to the ready signal lamp 211. Relay 247 is locked up at its inner contacts and back contact of relay 245 and thus holds the signal lamp circuit open. Relay 247 is released by operation of relay 245 on the next rightward movement of the furnace, at which time ground is also removed at relay 245 from the circuit including relay 239 and switch locking magnet 224, to permit the switch 221 to restore to normal. Thus by successive operations of switches 207a to f, switches 209a to f and switch 221, the muffles a to f may be indexed successively, or in any desired order, into unloading and loading positions.

The two switches 241 and 242 are disposed slightly beyond the extreme leftward and rightward limits of movement of the furnace and the function thereof is to interrupt the circuit to the pump solenoids 179 and 181 should any of the switches 193 or 193' fail to operate and thus prevent the furnace from overrunning beyond its prescribed limits of travel in either direction.

While in the illustrated embodiment, the furnace has been indexed to a common loading position for each muffle, it is to be understood that the furnace may be indexed into a single right hand position, as for instance, into the extreme right hand position indicated for the loading of muffle 42f. In such case only a single push bottom switch 209, such as 209f, and a single cam operated switch 193', such as 139'f, will be required. The roof of the pit, in such case, will be provided with six loading openings 202, one for each muffle. This arrangement has the advantage that the entire furnace may normally be retained in its right hand position, out from beneath the press 16 so that the press is not subjected to the heat therefrom, except during the brief unloading interval.

*Blank handling and forming mechanism*

The mechanism for inserting or removing the blanks from each of the muffles 42, as the furnace is indexed into each loading and unloading position, is shown in Figs. 18 to 25.

Referring first to Fig. 23, the cold blanks 69 to be loaded into the furnace are conveniently supported in a traveling rack or carriage 250 from which they are removed by a suitable electric hoist 251 and grapple 252 and lowered through the floor opening 202 into an open muffle indexed into position therebeneath. As has been explained, each blank is supported by the work holding fixture from a muffle cover so that upon lowering the blank into the muffle, the cover comes to rest on the muffle rim and, through a suitable sand seal, tightly closes the muffle. The heated blanks are removed from the muffles in the unloading position beneath the floor opening 201 by a second hoist 253 and grapple 254 and elevated into position between the dies 14 and 15, where a forming operation is completed. Thereafter, they are elevated above the forming press, moved to a position to the left of the press, and lowered into a second rack or carriage 250.

Each of the carriages 250 operates on tracks 255 and 256, centered relative to the overhead hoist rail 257, so as to facilitate the engagement of the grapple 252 with the spherical heads of the work holders of the blanks supported in the right hand rack, preparatory to the loading operation and to facilitate the aligning of the blank supporting covers on their seats in the left hand rack, following the forming operation.

Each of the carriages 250 comprises an open rectangular framework of structural members, the top frame 258 having a number of spaced transverse I-beam sections 259 on which are mounted collars 261 (Fig. 24) each having an upstanding elliptical flange for supporting the muffle cover 58 between the sealing flange 63 and the tubular body portion 62.

The grapples 253 and 254 are identical in structure and are best shown in Figs. 18 to 21. Each grapple comprises a horizontal cylinder 262 adapted to be supported from the hook 263 of the hoist by an eyelet 264. Depending from the cylinder 262 is a vertical cylinder 265 having a pair of lugs 266 extending outwardly from two opposite sides thereof. A pair of grapple arms 267 are pivoted, one between each pair of lugs 266, on pins 268, the lower ends of each arm having bifurcated lateral extensions 269, as best shown in Fig. 20, and each extension carries a pivoted roller 271. The extensions 269 are shaped so as to curve around the spherical heads 87 of the work holders and engage the same at four quadrantly spaced points when the grapple is lowered into engagement therewith. The grapple arms 267, above the pivots, curve outwardly beyond the ends of the horizontal cylinder 262 in alignment with the stems 272 of a pair of pistons 273, disposed in the opposite ends of the cylinder 262, which serve, when air pressure is applied between the pistons through an inlet 274, to force the upper arms outwardly against the tension of the springs 275 whereby to engage the rollers 271 with the work holding head 67.

The vertical cylinder 265, at its lower end, has a hardened insert 276 having a conical outer face and disposed within the cylinder is a hollow valve plunger 277, normally held upwardly therein by a spring 278, as shown in Fig. 19. In this position, a lateral passageway 279 to the central opening of the plunger is out of alignment with an inlet passageway 281 in the cylinder 265. A key 280, carried by the insert 276, prevents turning of the plunger within the cylinder and enables the passageways 279 and 281 to be aligned when the plunger is depressed.

The spherical head 67 of the work holder has a hardened insert 282 threaded therein, the upper face of which is concave for engagement with the insert 276 of the grapple when the latter is lowered into contact therewith. Within the insert 282 is a second insert 283 having lateral passageways 284, whereby a suitable gas under pressure admitted through the plunger 277 will have access to the lower face of a weighted check valve 285 to lift the same from its seat and permit the gas to enter through the passage 286 in the head 67 into the hollow shank 66 of the work holder.

This gas, as will be more fully explained, passes downwardly through the shank 66 into the interior of the blanks 69 and is vented therefrom through a tube 287 which extends into the blank to a point adjacent the lower end thereof. The upper end of tube 287 passes through the neck 288 of the work holder and terminates in a manual shut-off valve 289. Such gas, under pressure, is provided by a flexible hose 291 from a suitable source, through a valve 292 and pipe section 293, to the interior of the plunger 279.

Air under pressure is also provided through a flexible hose 294 to the interior of cylinder 262 and, when the pistons 273 are fully extended, through a passageway 295, to the upper end of the valve plunger 277 to depress the same.

The gas and air hoses 291 and 241 for the grapple 252 pass upwardly and around a pair of rollers 296 and thence through the loops 297 to the gas and air supply pipes 298 and 299, respectively. Each of these pipes is provided with electric valves 301 controlled by the gas and air supply switches 302 and 303, respectively, located adjacent the loading position. The hoses 291 and 294 of grapple 254 likewise pass over rollers 296 and through a loop to the gas and air pipes 298' and 299'. Only the air pipe 299', however, needs to be provided with a valve 301, in this case, and this valve is controlled by a switch 304, accessible from the platform 206 of the forming press.

The rollers 296 are carried by a bracket 305, which in the case of hoist 251, may be rigidly secured thereto, but in the case of hoist 253 it is desirable to mount the bracket on a suitable pivot 306 so that it may turn as the hoist moves past the gas and air pipes 298' and 299' during movement of the blanks from the press to the loading truck at the left thereof.

The operation of the hoisting and grapple mechanism during a loading operation is as follows. The hoist 251 is moved to the right by operation of the travel control switch 307 to bring the grapple vertically over one of the spherical holders 67 of a cover and blank assembly supported in the right hand rack 250, and is then lowered into contact therewith. The length of the piston rods 272 of the air cylinder 262 is such that when the grapple arms are opened, under the influence of springs 275, the rollers 271 are spaced only slightly greater than the diameter of the head 67. Therefore, if there is any inexactitude in the alignment of the grapple with the work holder, the rollers engaging the work holder serve to center the grapple relative thereto and permit the grapple arms to pass below the center thereof with the hardened insert 276 substantially aligned with the insert 282. The conical faces of these inserts as they engage further center the grapple relative to the holder. The attendant then, by operation of the air control switch 303, operates the air valve 301 to supply air under pressure to the cylinder 262, thereby to force the upper ends of the grapple arms outwardly and to clamp the spherical head 67 between the rollers 277 and insert 276. Upon the completion of this clamping movement of the grapple arms, the passageway 295 is opened, permitting the air to pass into the space above the valve plungers 265 whereby to force the same downwardly into sealing contact with the insert 282. The hoist 251 is now operated to vertically raise the muffle cover and blank from the rack and then to move it leftward into alignment with the floor opening 202 after which it is lowered to a point just above the floor. The gas valve 301 is now operated through the switch 302 to supply a protective or non-oxidizing atmosphere through the hose 291, the valve 292, pipe 293, and passageways 281 and 279 to the interior of the plunger 277, from which it passes through the passageways 284, opening the weighted valve 285, and continuing through the head 67 and hollow shank 66 into the interior of the blank, and serving to flush the same of the air which is contained therein, the gas being exhausted through the pipe to the tube 287 and valve 289. These operations are performed while the furnace is in the unloading or lefthand position so that immediately it is indexed to the loading position, the blade and muffle cover may be lowered into the open muffle. This is desirable in order that the period between the opening of the muffle in the unloading position and the closing thereof in the loading position will be as short as possible. During the lowering of the blade into the muffle, the valves 289 and 292 are manually operated to close the former and to operate the latter into position to connect the pipe 293 to the atmosphere through the outlet 308.

The cold blank so introduced into the muffle is surrounded by the lithiated atmosphere therein and, during the subsequent unloading and loading cycles of the remaining muffles, becomes heated to the proper forming temperature. As previously stated, the muffles are exhausted through the outlets 71 in the covers 58, these outlets terminating in an annular chamber 309 (Figs. 18, 20 and 22) provided with a vent 310 at which point the escaping gases are ignited. For the purpose of igniting the gases a pilot burner 311, Figs. 1 and 2, is provided within the pit 13 which projects a flame above the vent pipe 310 in the loading position of the furnace. These gases having once been ignited burn continuously until such time as the cover is subsequently removed in the unloading position.

When a muffle is indexed to the unloading position, the grapple 54 is lowered to engage the spherical head 67 of the muffle contained work holder in the manner just described, and the hoist 253 is operated to elevate the blade into position between the dies 14 and 15 of the press. The hoist is then moved slightly to the right to bring the blank into contact with the fixed die 15 and the movable die 14 is then operated, through the normal pres mechanism, to form the blank. After the dies have been brought together, the valve 292 on the grapple is manually operated to direct the protective or non-oxidizing gas from the hose 291 into the interior of the blank through the valve 285, as previously described. In this time, however, the valve 289 is closed, and as a result the full pressure of the gas line is applied to the interior of the blank to expand the same against the dies. This gas also serves to assist in the die quenching of the blank. After the forming operation has been completed, this internal gas pressure is relieved and thereafter the dies are opened. The hoist is then operated to elevate the blade from the press and to deposit it in the left hand rack 250, as previously stated.

It should be noted that during the movement of the blank from the muffle, the protective gases within the muffle are permitted to escape, and in doing so follow the blank upwardly into the dies and tend to envelop the blank during this movement so as to prevent any slight oxidation that might occur in movement of the hot blank through the air. This protection is also enhanced by the slight coating of lithium compound which forms on the parts during their heating in the lithiated atmosphere.

If desired, the flushing of the blank prior to loading into the muffle may be dispensed with and this operation effected during the heating period, and in Fig. 25 I have shown a modification for effecting this result. In this figure the muffle exhaust vents 71 and annular chamber 309 conduct the gases from the muffle into a conduit 312 connected into the neck 288 of the work holder so that these gases pass into the interior of the shank 266 of the work holder and thence into the blank, and are exhausted therefrom through the tubing 287 and the valve 289, this latter valve remaining open during the heating period when operating under this procedure. A valve 313 is provided in the spherical head 67 which is adapted to be closed during the heating period to prevent the escape of these gases through the opening 286 therein. As a consequence, the lithiated gases not only surround the blanks but serve to protect the blanks both exteriorly and interiorly from oxidation or decarburization. When the blank is raised into forming position, the valves 289 and a valve 314 in the conduit 312 are closed, and the valve 313 is opened to permit a high gas pressure to be produced interiorly of the blank during the forming operation in the manner previously described.

This arrangement for circulating the muffle gases both exteriorly and interiorly of the blanks is particularly useful where it is desired to cause a replacement of carbon in the exterior and interior surfaces of the tubular blanks simultaneously with the heating thereof for forming. In the forming of steel propellers or other tubular forms from thin alloy stock, it is extremely difficult to obtain such stock free from mill surface decarburization. This surface decarburization occurs at the mill during the heating for rolling or working of the stock and heretofore it has been found necessary in practice to grind or machine both surfaces of the stock sufficiently to remove the decarburized layer. This is an expensive and time consuming operation and causes unevenness in the thickness of the stock. In accordance with the present invention, however, the surface decarburization may be corrected by utilizing a carburizing gas of correct constituency in the muffles in place of a neutral gas thereby to replace the carbon previously lost in the mill operation. Thus varying the ratio of the carbonaceous gas and air mixture which is supplied to the muffles through a cracking unit, such as shown in the patent of H. J. Ness, No. 2,394,002, granted February 5, 1946, any desired carbon concentration may be produced in the surface of the blanks being heated. For instance, with a blank composed of a steel containing .4% carbon, the gas ratio would be adjusted to an equilibrium of .4% carbon whereby to build up the surface carbon of the blank to this percentage. The degree or percentage of carburization is dependent solely upon the gas ratio and is independent of the period of heating, time affecting only the depth of penetration, so that the heating cycle for the purpose of forming the blanks may be accommodated substantially entirely to the press operation.

In a preceding paragraph reference has been made to the use of a protective or non-oxidizing gas for use in flushing the blanks before loading into the muffle, and for applying a pressure internally thereof during the forming operation. For this purpose it is desired to employ a gas resulting from the products of combustion of a hydrocarbon fuel and air, which have been dried by passing over fuming lithium salts and subsequently cooled.

If desired, a small amount of lithium metal or a suitable compound, such as the chloride or fused mixture of lithium carbonate and lithium chloride, may be inserted in the blank before loading of the muffle, and this will serve additionally to dry the gas within the blank during both the heating and forming operations. This will not be required when the muffle atmosphere is circulated through the interior of the blank, since this atmosphere will deposit a thin film of lithium and lithium compounds on the interior surfaces which will protect the same during the forming operation.

It will be understood, of course, that many variations may be made in the construction and control of the operation of the furnace, in the mechanism for indexing the same into the various loading and unloading positions and in the association of the furnace with the forming press so that we do not desire to be limited to the specific arrangement or arrangements illustrated and described but contemplate all such changes as come within the scope of the appended claims.

What we claim is:

1. The combination of a furnace having a closed heating chamber, means for supporting a hollow work part, to be heated, in said chamber, means for admitting a fluid medium to said chamber, exteriorly of said work part, means for passing at least a part of said fluid medium from said chamber into the interior of said work part, and means for venting the interior of said work part exteriorly of said chamber.

2. The combination of a furnace having a closed heating chamber, means for supporting a hollow work part, to be heated, in said chamber, means for continuously admitting a protective gas atmosphere to said chamber exteriorly of said work part, means for continuously venting said gas atmosphere from said chamber and means for passing said vented gas atmosphere through the interior of said work part, while the latter part is in the heating chamber.

3. The combination of a furnace having a heating chamber, a closure member having sealing engagement with said chamber and including means for supporting a hollow work part in said chamber, a passageway through said supporting means communicating with the interior of said work part and with the interior of said chamber and means for passing a protective gas atmosphere through said chamber and thence through said passageway into said hollow work part.

4. The combination with a metallurgical furnace comprising a combustion chamber and vents for said combustion chamber, of ventilating means in operative relation to said vents and means for effecting traveling motion of said furnace relative to said ventilating means while maintaining said vents in such operative relation to said ventilating means.

5. The combination with a combustion furnace adapted to travel in a prescribed path and arranged to be stopped in predetermined positions along said path of travel, and having a plurality of vents for the exhaust gases therefrom, of ventilating means having inlet openings in alignment with said vents in each of said stopped positions of said furnace, for reception of the exhaust gases therefrom.

6. A metallurgical furnace comprising a combustion chamber, a plurality of muffles disposed in said chamber, an individual closure member for each of said muffles, a second combustion chamber, a plurality of vaporizing receptacles in said second combustion chamber, at least one of which is individual to each of said muffles, each of said vaporizing receptacles having individual closure members and being adapted to support a vaporizable material therein, means for passing a gaseous medium through each of said receptacles and thence into each of the associated muffles and means for venting each of said muffles.

7. In a metallurgical furnace, the combination of a plurality of muffles, individual closure members therefor, heating means for said muffles, a plurality of vaporizing receptacles, at least one of which is individual to each of said muffles, said receptacles being adapted to contain a vaporizable material, heating means for said receptacles, means for passing a gaseous medium through each of said receptacles and thence into its associated muffle and vents for each of said muffles to permit the escape of said gaseous medium therefrom.

8. The combination of a carriage adapted to travel in a prescribed path and a furnace mounted on said carriage, said furnace comprising a plurality of muffles, heating means for said muffles, a plurality of vaporizing receptacles, at least one of which is individual to each of said muffles, said receptacles being adapted to contain a vaporizable material, heating means for said receptacles, a source of gaseous medium apart from said carriage and furnace, means for supplying said gaseous medium to each of said receptacles during the travel of said carriage in said prescribed path, means for passing said medium from each of said receptacles into its associated muffle and vents for each of said muffles to permit the escape of said gaseous medium therefrom.

9. A metallurgical furnace comprising a traveling carriage, a furnace structure mounted upon said carriage for movement therewith and comprising a combustion chamber and a heating chamber, burners for said combustion chamber, a source of air under pressure for said burners carried by said carriage, a source of fuel for said burners and a source of gaseous atmosphere for said heating chamber, said sources being disposed apart from said carriage, conduit means extending from each of said sources to said burners and to said heating chamber, respectively, for supplying fuel and gaseous atmosphere respectively thereto during the movement of said furnace and means carried by said carriage and forming a part of the conduit means for said gaseous atmosphere for adding a vaporizable constituent to said atmosphere.

10. The combination of a traveling carriage movable in a prescribed path, a furnace carried by said carriage and movable therewith, a plurality of spaced heating chambers in said furnace having individual closure members, means for supplying a gaseous atmosphere to each of said chambers, means for separately venting said chambers and means disposed along the path of travel of said furnace for igniting said gaseous medium as it issues from said venting means.

HAROLD J. NESS.
CHARLES E. THOMAS.

(References on following page)

REFERENCES CITED

The following references are of record in the file of this patent:

UNITED STATES PATENTS

| Number | Name | Date |
|---|---|---|
| 77,210 | Player | Apr. 28, 1868 |
| 709,631 | Hadfield | Sept. 23, 1902 |
| 1,112,074 | Lichter | Sept. 29, 1914 |
| 1,343,019 | Wikstrom | June 8, 1920 |
| 1,516,332 | Chisholm | Nov. 18, 1924 |
| 1,816,253 | Girschowitch | July 28, 1931 |
| 1,934,614 | Peterson | Nov. 7, 1933 |
| 1,960,808 | Cope | May 29, 1934 |
| 2,025,542 | Lugar | Dec. 24, 1935 |
| 2,030,721 | Scott | Feb. 11, 1936 |
| 2,049,711 | Lundy | Aug. 4, 1936 |
| 2,081,645 | Squires | May 25, 1937 |
| 2,101,149 | Martin | Dec. 7, 1937 |
| 2,205,182 | Whitten | June 18, 1940 |
| 2,221,539 | Gehret | Nov. 12, 1940 |
| 2,240,146 | Ness | Apr. 29, 1941 |
| 2,243,174 | Stevenson | May 27, 1941 |
| 2,254,891 | Germany | Sept. 2, 1941 |
| 2,303,473 | Jones | Dec. 1, 1942 |
| 2,327,117 | Lorant | Aug. 17, 1943 |
| 2,394,002 | Ness | Feb. 5, 1946 |

FOREIGN PATENTS

| Number | Country | Date |
|---|---|---|
| 344,027 | Great Britain | Mar. 2, 1931 |

OTHER REFERENCES

"Industrial Furnaces," by Trinks, vol. II, 2d ed., Figure 196, page 198.